United States Patent [19]

Hanson

[11] Patent Number: 5,361,659
[45] Date of Patent: Nov. 8, 1994

[54] APPARATUS AND METHOD FOR COUNTERBORING A PIPE

[75] Inventor: Beverley F. Hanson, Sherwood Park, Canada

[73] Assignee: CRC-Evans Pipeline International, Inc., Houston, Tex.

[21] Appl. No.: 48,457

[22] Filed: Apr. 16, 1993

[51] Int. Cl.⁵ .................. B23B 3/26; B23B 5/16
[52] U.S. Cl. ........................ 82/113; 82/1.2
[58] Field of Search ............ 82/1.2, 1.3, 1.4, 113, 82/158, 161

[56] References Cited

U.S. PATENT DOCUMENTS

| | | |
|---|---|---|
| 2,215,344 | 9/1940 | Albrecht . |
| 2,711,664 | 6/1955 | Misuraca ................. 82/161 |
| 3,608,406 | 9/1971 | Paysinger et al. . |
| 3,691,881 | 9/1972 | Bachmann ............... 82/113 |
| 3,699,828 | 10/1972 | Piatek et al. ............. 82/113 |
| 3,733,939 | 5/1973 | Paysinger et al. . |
| 3,835,738 | 9/1974 | Kellum et al. . |
| 4,126,065 | 11/1978 | Clavin .................... 82/113 |
| 4,532,837 | 8/1985 | Cushenbery et al. ..... 82/113 |
| 4,550,635 | 11/1985 | Kanayama et al. ...... 82/113 |
| 4,634,323 | 1/1987 | Wagner et al. . |
| 4,682,919 | 7/1987 | Mitchell ................ 409/179 |
| 4,822,221 | 4/1989 | Illakowicz . |
| 4,944,205 | 7/1990 | Ricci ..................... 82/113 |
| 5,054,342 | 10/1991 | Swiatowy et al. ........ 82/113 |
| 5,171,110 | 12/1992 | Pettifer et al. . |

Primary Examiner—William E. Terrell
Attorney, Agent, or Firm—Richards, Medlock & Andrews

[57] ABSTRACT

An apparatus for machining a counterbore in a pipe is provided which comprises an expander unit adapted for being secured against the inside surface of a pipe. A shaft extends from the expander unit coaxial with the pipe and a flywheel is rotatably and slidably mounted on the shaft. A pair of parallel guide structures are mounted on the face of the flywheel, and a frame is slidably mounted on the parallel guide structures such that the frame is linearly movable along the guide structures in a radial direction relative to the shaft. A cutting tool is mounted to the frame and has a distal end that is extendable radially beyond the radially outermost point of the frame. A pair of actuators are attached to the frame and to the flywheel such that the actuators can move the frame along the guide structures and force the cutting tool against the inside surface of the pipe during the counterboring procedure.

21 Claims, 5 Drawing Sheets

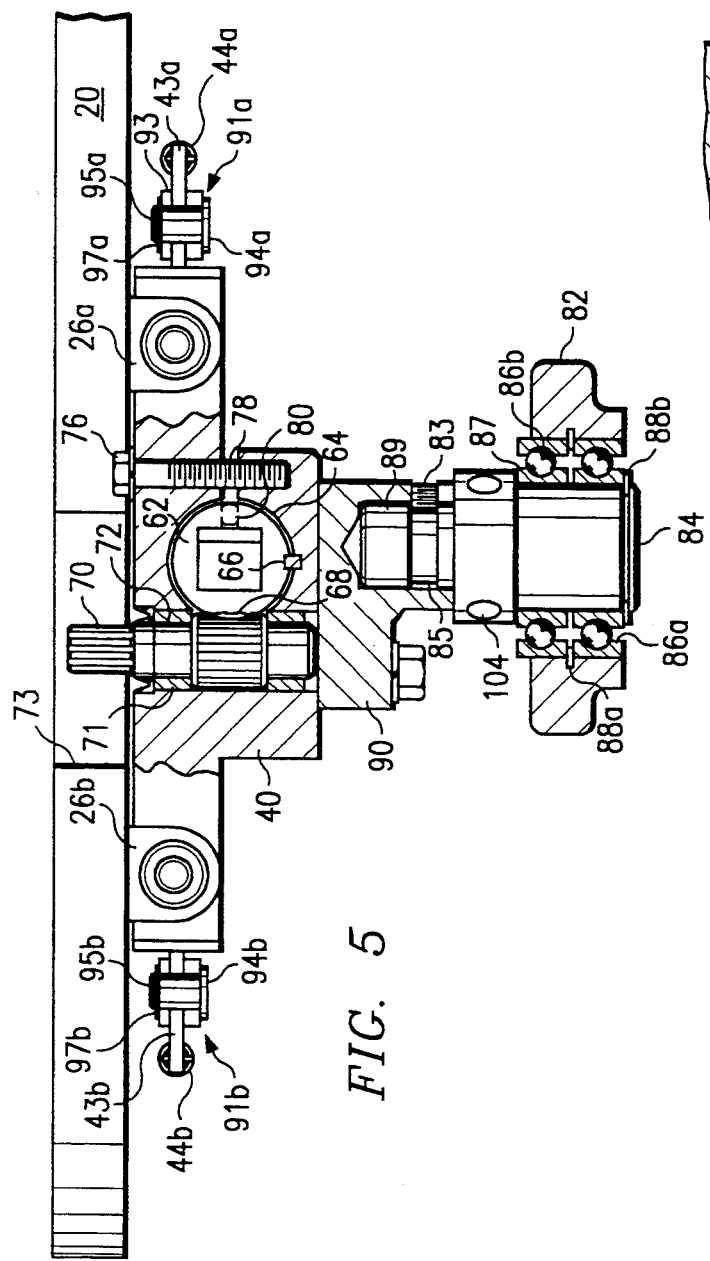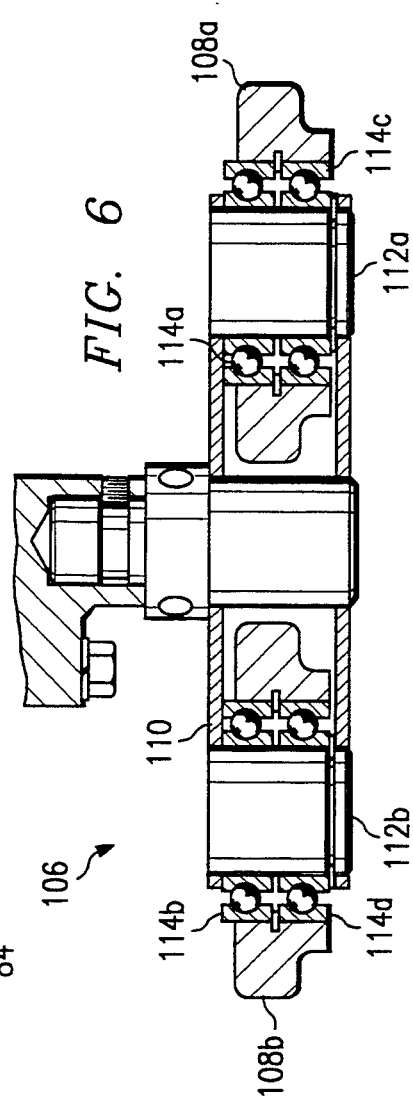

APPARATUS AND METHOD FOR COUNTERBORING A PIPE

FIELD OF THE INVENTION

This invention generally relates to an apparatus and method for counterboring a pipe. More specifically it relates to an apparatus for rotating and axially advancing a cutting tool against the inside surface of a pipe.

BACKGROUND OF THE INVENTION

In connecting two pipes together, it is often advantageous to counterbore one pipe end so that it can be appropriately matched with the end of another pipe end to facilitate proper welding of the two pipe ends together. Precision and accuracy are desired when counterboring pipe ends. The machining device must be held firmly in relation to the pipe in order to achieve these results. Further, in many instances a pipe in the field is out of round due to rough handling or manufacturing defects. Also, weld seams along the length of the pipe may provide an irregular surface. It is desirable that the machining tool follow the inner surface of the pipe with high precision to ensure uniform machining of a counterbore.

U.S. Pat. No. 5,171,110 to Pettifer et al. (the Pettifer '110 patent) discloses one such machining tool that rotates a cutting tool against the inside circumferential surface of the pipe end and advances it axially into the pipe until a counterbore has been formed. In the Pettifer '110 patent, the cutting tool is pivotally connected to a rotating flywheel and the cutting tool is pressed radially outward against the inside surface of the pipe by being rotated about its pivot point. Thus the cutting tool of the Pettifer '110 patent follows the inside contour of the pipe by oscillating arcuately about its pivot point. The Pettifer '110 patent discloses a single actuator which pivots the cutting tool about its pivot point.

It has been found that a need exists for an improvement in the device of the Pettifer '110 patent which will provide an improved adjustment of the radial extent of the cutting tool during operation as well as provide improved forcing of the cutting against the inside surface of the pipe. The present invention provides a marked improvement over the cutting tool control of the invention of the Pettifer '110 patent.

SUMMARY OF THE INVENTION

The present invention provides a counterboring apparatus for machining a counterbore in a pipe. The apparatus comprises an expander unit which is adapted for being secured inside of the pipe against the inside surface of the pipe. The shaft extends axially from the expander unit and has a center axis coaxial with the longitudinal axis of the pipe when the expander unit is secured against the inside surface of the pipe. A flywheel is rotatably and slidably mounted on the shaft. The flywheel has a rotational axis coaxial with the center axis of the shaft and a front side axially facing the expander unit. The flywheel is slidable in an axial direction along the shaft over a distance at least the length of the counterbore to be machined in the pipe. The flywheel is simultaneously slidable and rotatable on the shaft. A pair of guide structures are attached to the flywheel spaced apart from each other and oriented in parallel relation to each other. Each guide structure has a first end and a second end each extending from the front side of the flywheel, and a guide rod section spanning from the first end to the second end in a plane parallel to the front side of the flywheel and set off axially from the front side of the flywheel such that there is a clearance between the guide rod sections and the front side of the flywheel. Each guide structure is located substantially the same distance from the center axis of the flywheel.

A frame is slidably disposed on the guide rod sections of the pair of guide structures such that the frame is linearly slidable in a radial direction relative to the center axis of the flywheel along the guide rod sections. A cutting tool is adjustably mounted to the frame at a proximal end and has a distal end that is extendable radially beyond the radially outermost point of the frame. A pair of actuators are attached at a frame end to the frame and at a flywheel end to the flywheel. The pair of actuators are oriented and located such that the actuators can move the frame along the guide rod sections of the pair of guide structures.

By having two actuators which move the frame linearly in a radial direction the cutting tool can be better forced against the inside surface of the pipe during the counterboring procedure. Additionally, when the cutting tool is rotated past local surface irregularities such as weld seams the double perpendicular nature of the actuators forcing the cutting tool directly radially outward reduces the radially inward vector of the force of the local surface irregularity acting against the cutting tool thus better allowing the cutting tool to shear through the local surface irregularity and maintain an overall uniformly circular counterbore.

BRIEF DESCRIPTION OF THE DRAWINGS

A better and more complete understanding of the present invention and advantages thereof will be gained from the following detailed description, claims and accompanying drawings in which:

FIG. 5 is a partial sectional top view of FIG. 4; and FIG. 6 is a partial sectional side view of an alternate embodiment of the present invention in which a pair of laterally adjacent guide wheels are used.

DETAILED DESCRIPTION

Figure 1:
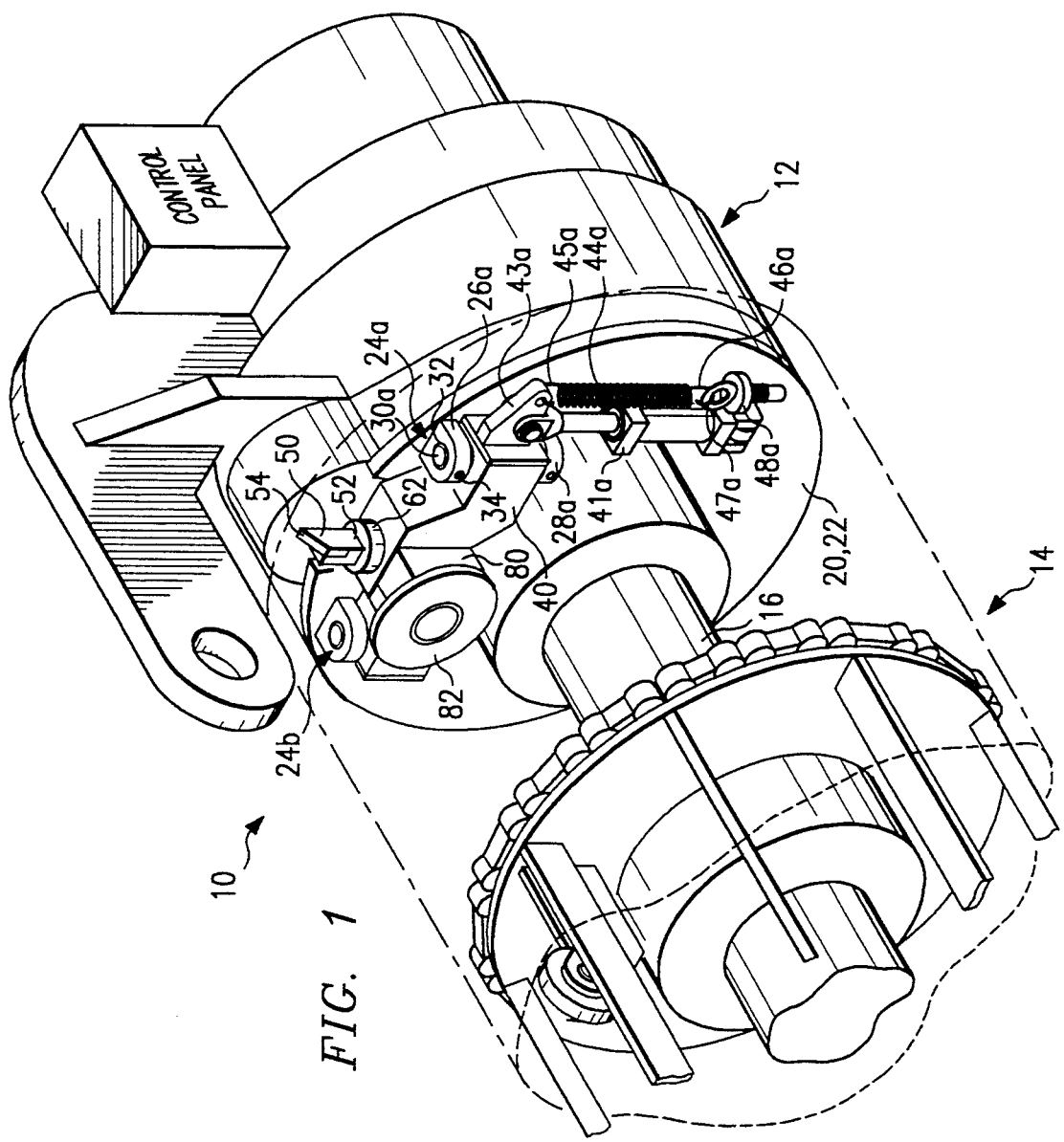
FIG. 1 is a perspective view of the present invention.

With reference to the accompanying FIGS. 1–4, wherein like reference numerals designate like or corresponding parts through the several views, the preferred embodiment of the present invention is explained hereinafter.

FIG. 1 illustrates a perspective view of the counterbore apparatus 10 of the present invention. Apparatus 10 has housing 12 which contains the controls and drive motors needed for operation of the apparatus. Opposite from housing 12 is expander unit 14 which is sized and constructed for being inserted into a pipe and secured against the inside surface of the pipe. Shaft 16 extends axially from expander unit 14 and extends into housing 12. Shaft 16 has a center axis coaxial with the longitudinal axis of the pipe when the expander unit is secured against the inside surface of the pipe. Preferably, the housing 12, expander unit 14, and shaft 16 assembly are the same as disclosed and described in the U.S. Pat. No.

5,171,110. The disclosure and teachings of U.S. Pat. No. 5,171,110 to Pettifer et al. is incorporated herein by reference.

Flywheel 20 is rotatably and slidably mounted on shaft 16. Flywheel 20 has a rotational axis coaxial with the center axis of shaft 16. Flywheel 20 has front side 22 axially facing expander unit 14. Flywheel 20 is slidable in an axial direction along the shaft 16 over a distance of at least the length of the counterbore to be machined in the pipe. Flywheel 20 is simultaneously slidable and rotatable on shaft 16.

Figure 2:
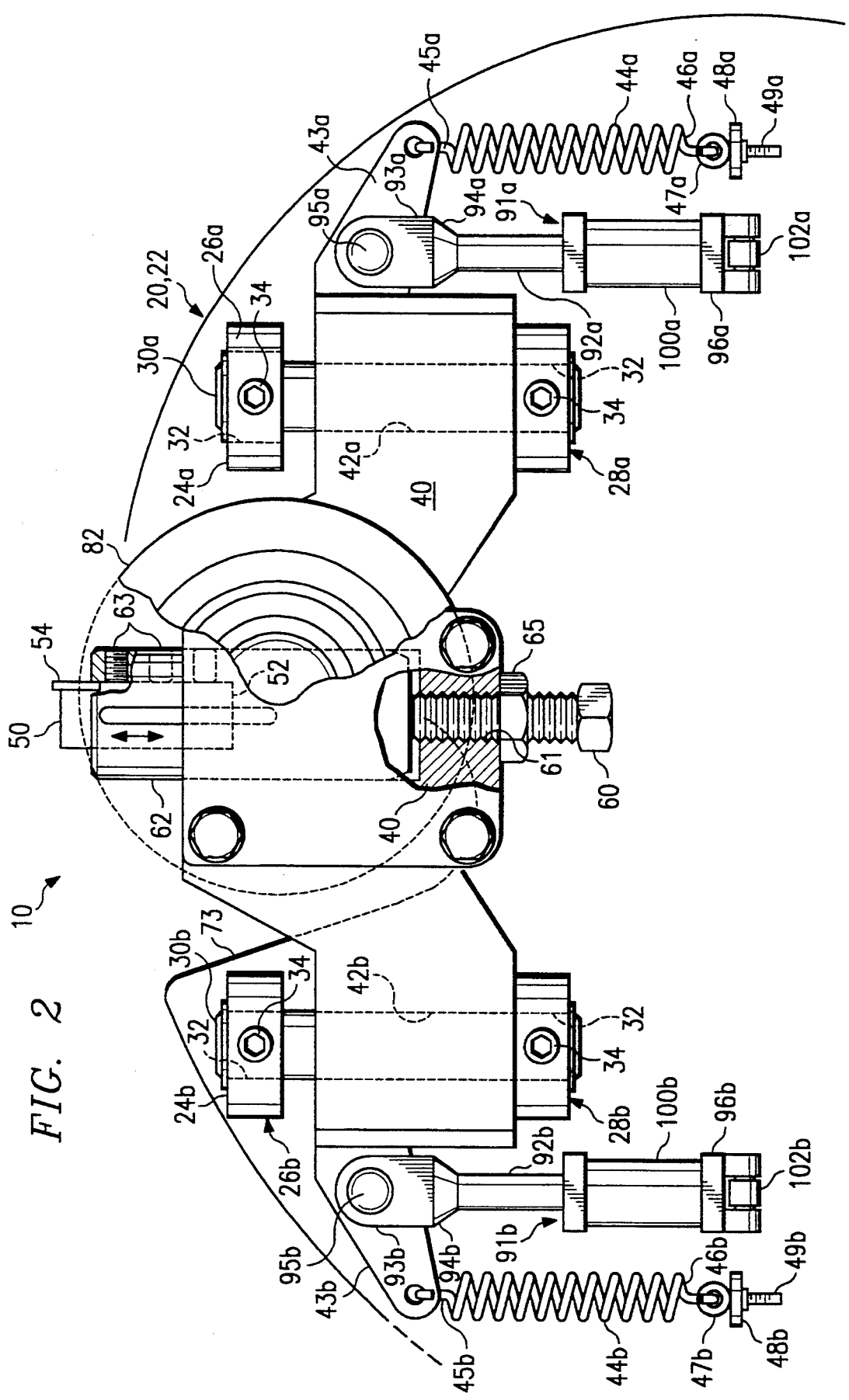
FIG. 2 is a partial sectional side view of the present invention.

With additional reference to FIG. 2, further structure of the present invention can be more clearly seen. A pair of guide structures 24a,b are attached to front side 22 of the flywheel 20 spaced apart and parallel to each other. Each guide structure 24a,b has first end 26a,b and second end 28a,b each connected to front side 22 of flywheel 20. Each guide structure 24a,b also has guide rod sections 30a,b spanning from first ends 26a,b to second ends 28a,b in a plane parallel to front side 22 of flywheel 20 and set off axially from front side 22 of flywheel 20 such that there is a clearance between guide rod sections 30a,b and front side 22. Each guide structure 24a,b is located substantially the same distance from the center axis of flywheel 20. In the preferred embodiment first ends 26a,b and second ends 28a,b are lugs extending perpendicular from front side 22 that have holes 32 therein. Holes 32 in first ends 26a,b are aligned with holes 32 in second ends 28a,b. Guide rod sections 30a,b are cylindrical rods which are disposed through holes 32 and have an outer diameter slightly smaller than the inner diameter of the holes 32. Guide rods sections 30a,b are retained in holes 32 by set screws 34 which screw through first ends 26a,b and second ends 28a,b to contact the outer surface of guide rod sections 30a,b and lock guide rod sections 30a,b in place inside holes 32. Guide rod sections 30a,b are parallel to each other.

Frame 40 is slidably disposed on guide rod sections 30a,b. Frame 40 defines a pair of guide channels 42a,b through which guide rod sections 30a,b are disposed. In the preferred embodiment, placement of frame 40 on guide structures 24a,b involves placing frame 40 between first ends 26a,b and second ends 28a,b such that guide channels 42a,b are aligned with holes 32. Then guide rod sections 30a,b are inserted through holes 32 and guide channels 42a,b after which set screws 34 are tightened until guide rod sections 30a,b are locked into first ends 26a,b and second ends 28a,b. After such assembly frame 40 is linearly slidable along guide rod sections 30a,b in a radial direction relative to the center axis of flywheel 20.

Frame 40 has a pair of frame lugs 43a,b each extending from an opposite side of frame 40 near one of the guide channels 42a,b. Springs 44a,b are each attached at first ends 45a,b to frame lugs 43a,b and at second ends 46a,b to flywheel 20. Preferably second ends 46a,b are attached to threaded eye bolts 47a,b which are adjustably bolted to lugs 48a,b by nuts 49a,b. Springs 44a,b act to bias frame 40 radially inwardly along guide rod sections 30a,b.

Figure 3:
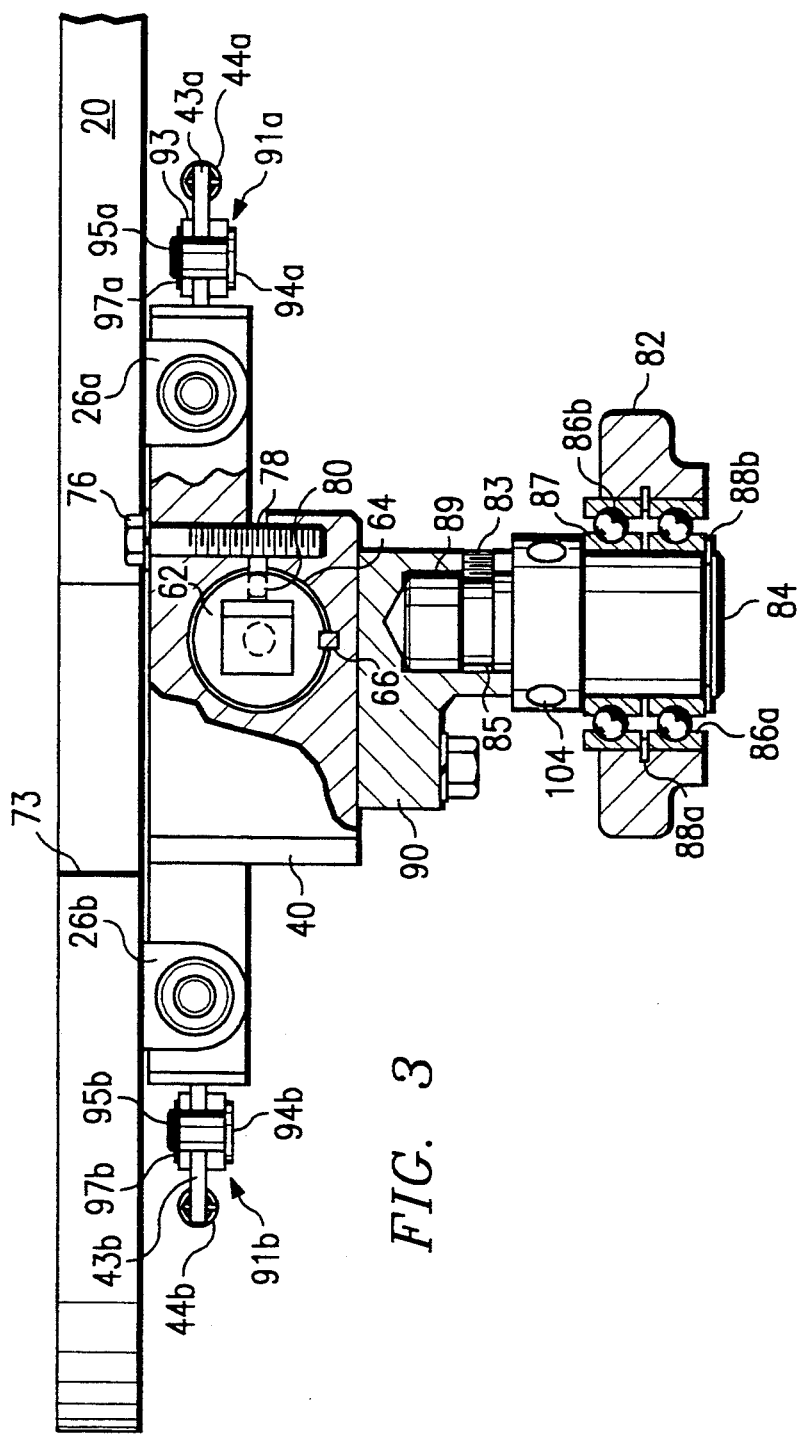
FIG. 3 is a partial sectional view of FIG. 2.

Cutting tool 50 has proximal end 52 adjustably mounted to frame 40 and distal end 54 that is extendable radially beyond the radially outermost point of frame 40. Cutting tool 50 is typically made of a carbide compound. Referring to FIGS. 2 and 3, cutting tool 50 is mounted in tool post 62 and held therein by allen screws 63. Tool post 62 is located in bore 64. In the presently preferred embodiment, the radial extent of tool post 62 is adjustable within bore 64 by set screw 60 which is threaded into hole 61 such that rotating set screw 60 radially adjusts tool post 62. Locking nut 65 allows set screw 60 to be fixed from movement once tool post 62 is at the desired radial extent.

When tool post 62 is at the desired height, clamping bolt 76, which threadedly engages bore 78, can be rotated to exert a clamping force on tool post 61. Such a clamping reduces relief slot 80 thus fixing tool post 62 in place in bore 64. Thus, clamping bolt 76 is used to maintain the vertical adjustment of tool post 62 and therefore cutting tool 50. Loosening clamping bolt 76 releases the clamping force on tool post 62. After cutting tool 50 is properly positioned, bolts 76 are then tightened into bores 78 until frame 40 clamps against tool post 62 thereby securing tool post 62 to frame 40.

With reference to FIG. 3, the rotational orientation of tool post 62 relative to frame 40 is maintained by tool post key 66.

Figure 4:
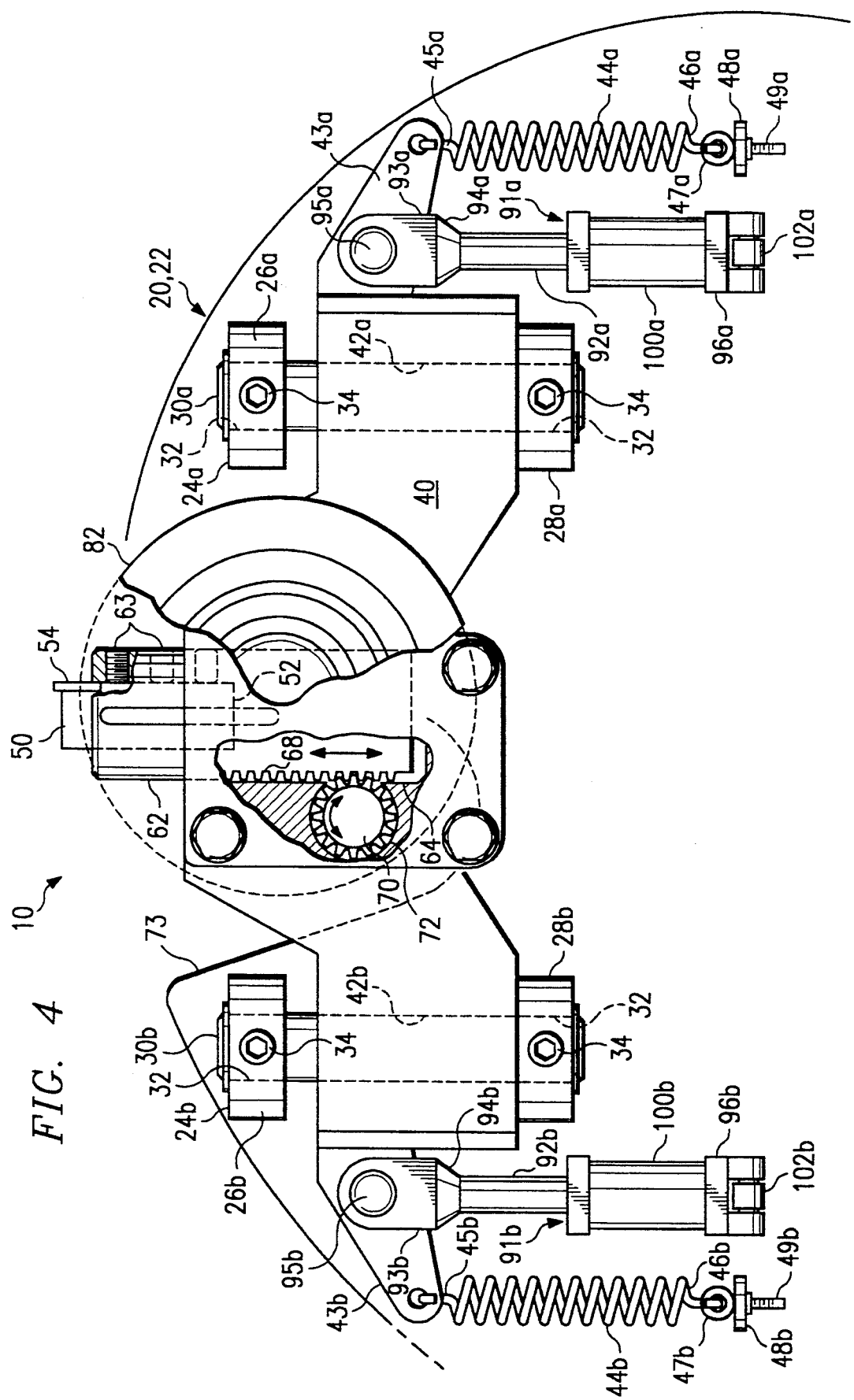
FIG. 4 is a partial sectional side view of an alternative embodiment of the present invention.

FIGS. 4 and 5 show an alternative embodiment of adjusting the radial extent of tool post 62, tool post 62 has gear teeth 68 that interact with pinion 70 thereby allowing pinion 70 to be rotated to adjust the radial extent of cutting tool 50. Pinion 70 is located in bore 72. Pinion 70 extends through envelope 71 in frame 40. The head of pinion 70 is accessibly located within groove 73 in flywheel 20 and may be rotated until the desired radial extent of cutting tool 50 is achieved.

Located forward of cutting tool 50 is guide wheel 82. Guide wheel 82 is attached to shank 84 through roller bearings 86 and 88. Roller bearings 86a,b are held in place by bearing seat 87 of shank 84 and snap rings 88a,b. Shank 84 is located in bore 89 of frame extension 90 and held in place by allen screw 83 tightened against relief 85 of shank 84. The end of shank 84 which is located in bore 89 of frame extension 90 is machined eccentrically to the rest of shank 84 with the axis of this end running parallel to the axis of the other end on which bearing seat 87 is machined. The distance between the parallel axes may vary. In construction of the present machines this distance is approximately ⅛ inch.

The eccentric shaft allows guide wheel 82 to be adjusted relative to cutting tool 50. When the set screw 83 is loosened, shank 84 may be turned in bore 89 by inserting a spanner wrench or the end of a bar in radial hole 104 located in the shouldered bearing seat portion 87 of shank 84 and applying proper force to the bar or wrench, thereby producing an eccentric movement of guide wheel 82 relative to bore 89 of the frame and thus relative to cutting tool 50 which is fixed to frame 40 by tool post 62 and clamping bolts 76.

The present invention also comprises a pair of actuators 91a,b are shown each having one end that will be referred to as frame end 94 and another end that will be referred to as flywheel end 96. Frame ends 94a,b are connected to frame lugs 43a,b on frame 40. Flywheel ends 96a,b are connected to flywheel 20. Frame ends 94a,b of pistons 92a,b are the free ends of pistons 92a,b which is disposed in clevis 93a,b which have pins 95a,b extending through clevis 93a,b and frame lugs 43a,b of frame 40 so that the free ends of piston 92a,b is secured to frame 40. Snap rings 97a,b are placed on pins 95a,b to retain pins 95a,b in place in clevis 93a,b. Pistons 92a,b extend into hydraulic chambers 100a,b. Flywheel ends 96a,b of actuators 91a,b are attached to flywheel 20 at lugs 102a,b. Preferably, actuators 91a,b are oriented parallel to each other so that they provide uniform application of pressure against frame 40. Hydraulic chambers 100a,b are typically hydraulically charged by a bladder type accumulator pre-loaded with pressurized nitrogen. Actuators 91a,b linearly move frame 40 along guide rod sections 30a,b in a radial direction.

In operation, expander unit 14 is inserted into the pipe so as to engage the inside surface of the pipe. Springs 44a,b and/or actuators 91a,b are used to retract frame 40 radially inwardly along guide rod sections 30a,b far enough until guide wheel 82 can be inserted into the pipe just past the axial end face of the pipe. Then actuators 91a,b are used to radially extend frame 40 until guide wheel 82 is pressed against the inside surface of the pipe. Also, flywheel 20 is axially extended along shaft 16 until cutting tool 50 is proximal the axial end face of the pipe. Then, flywheel 20 is rotated and advanced axially towards the expander unit 14 wherein cutting tool 50 machines away a portion of the thickness of the pipe to create a counterbore. The diameter of the counterbore is controlled by the distance between distal end 54 of cutting tool 50 and the radially outer most extent of guide wheel 82.

Referring to FIG. 6, a partial sectional view is shown of guide wheel tandem 106 that can be used in an alternate embodiment. Spiral welding may be utilized in forming pipe. This manufacturing process produces a spiraling weld on the inner surface of the pipe end to end. The weld tends to offset the guide wheel and therefore the cutting tool. In order to minimize this problem, a pair of guide wheels 108a,b can be utilized. The guide wheels 108a,b are captured in bearing housing 110 and are journaled on bearing shanks 112a,b by roller bearings 114a–d. Guide wheels 108a,b are positioned in-line and off-axis from each other. While one guide wheel is disrupted by the weld, the other guide wheel maintains its position against the inner pipe. The offset associated with a single guide wheel is reduced by approximately one-half when utilizing a two guide wheel configuration.

Although embodiments of the present invention have been illustrated in the accompanying drawings and described in the foregoing detailed description, it will be understood that the invention is not limited to the embodiments disclosed but is capable of numerous rearrangements, modifications and substitutions without departing from the scope of the invention as set forth in the appended claims.

I claim:

1. An apparatus for machining a counterbore in a pipe, the pipe having an inside surface, a longitudinal axis, an axial end face with a radial extent and an outside surface, the apparatus comprising:
   (a) an expander unit adapted for being secured against the inside surface of the pipe;
   (b) a shaft extending from the expander unit that has a center axis coaxial with the longitudinal axis of the pipe when the expander unit is secured against the inside surface of the pipe;
   (c) a flywheel rotatably and slidably mounted on the shaft, the flywheel having a rotational axis coaxial with the center axis of the shaft, and a front side axially facing the expander unit, the flywheel being slidable in an axial direction along the shaft over a distance at least the length of the counterbore to be machined in the pipe, the flywheel being simultaneously slidable and rotatable on the shaft;
   (d) a pair of guide structures mounted on the flywheel parallel to each other and each having a first end and a second end each connected to the flywheel, and a guide rod section extending from the first end to the second end in a plane parallel to the front side of the flywheel and set off axially from the front side of the flywheel such that there is a clearance between the guide rod sections and the front side of the flywheel, each guide structure being located substantially the same distance from the center axis of the flywheel;
   (e) a frame defining a pair of guide channels therein that are slidably disposed on the guide rod sections of the pair of guide structures such that said frame is linearly slidable in a radial direction relative to the center axis of the flywheel along the guide rod sections;
   (f) a cutting tool having a proximal end adjustably mounted to the frame and a distal end that is radially beyond the pair of guide structures and is extendable radially beyond the radially outermost point of the frame;
   (g) a first guide wheel rotatably mounted to the frame and situated between the cutting tool and the expander unit, the guide wheel having an axis of rotation parallel to that of the flywheel, the radially outermost point of the guide wheel being radially outward of the pair of guide structures and radially outward of the frame such that the frame and the pair of guide structures can travel with the guide wheel into the interior of the pipe during counterboring; and
   (h) a pair of actuators each having a frame end connected to the frame and a flywheel end connected to the flywheel, the pair of actuators oriented and located such that the actuators can move the frame along the guide rod sections of the pair of guide structures, the pair of actuators located inward of the cutting tool.

2. The apparatus of claim 1 wherein the actuators comprise hydraulically actuable pistons.

3. The apparatus of claim 2 further comprising a second guide wheel rotatably mounted to the frame laterally adjacent the first guide wheel.

4. The apparatus of claim 1 further comprising:
   (a) a pinion intermeshed with gear teeth located on the cutting tool for adjusting the radial extent of the cutting tool;
   (b) a relief slot located in the frame proximate to the cutting tool; and
   (c) at least one locking bolt extending through the relief slot threadedly engaging the frame securing the position of the cutting tool once adjusted.

5. The apparatus of claim 4 wherein said flywheel has a notch therein located to allow access to the pinion.

6. The apparatus of claim 1 wherein said frame comprises:
   (a) a pair of frame lugs each extending in opposite radial directions from the frame; and
   (b) a frame extension that extends axially towards the expander unit on which the guide wheel is located.

7. The apparatus of claim 1 wherein each of the actuators comprises a hydraulic chamber with a piston, the piston having one end connected to the frame and the hydraulic chamber being attached to the flywheel.

8. The apparatus of claim 1 wherein the proximal end of the cutting tool comprises a tool post disposed in a bore defined in the frame.

9. The apparatus of claim 8 further comprising an adjustable set screw extending through the frame into the bore and in contact with the bottom of the tool post.

10. The apparatus of claim 9 further comprising a relief slot located in the frame proximate to the cutting tool and at least one locking bolt extending through the relief slot threadedly engaging the frame for securing the position of the cutting tool once adjusted.

11. The apparatus of claim 9 further comprising a locking nut on the set screw for securing the set screw at a desired position.

12. An apparatus for machining a counterbore in a pipe, the pipe having an inside surface, a longitudinal axis, an axial end face with a radial extent and an outside surface, the apparatus comprising:
 (a) an expander unit adapted for being secured against the inside surface of the pipe;
 (b) a shaft extending from the expander unit that has a center axis coaxial with the longitudinal axis of the pipe when the expander unit is secured against the inside surface of the pipe;
 (c) a flywheel rotatably and slidably mounted on the shaft, the flywheel having a rotational axis coaxial with the center axis of the shaft, and a front side axially facing the expander unit, the flywheel being slidable in an axial direction along the shaft over a distance at least the length of the counterbore to be machined in the pipe, the flywheel being simultaneously slidable and rotatable on the shaft;
 (d) a pair of guide structures mounted on the flywheel parallel to each other and each having a first end and a second end each connected to the flywheel, and a guide rod section extending from the first end to the second end in a plane parallel to the front side of the flywheel and set off axially from the front side of the flywheel such that there is a clearance between the guide rod sections and the front side of the flywheel, each guide structure being located substantially the same distance from the center axis of the flywheel;
 (e) a frame defining a pair of guide channels therein that are slidably disposed on the guide rod sections of the pair of guide structures such that said frame is linearly slidable in a radial direction relative to the center axis of the flywheel along the guide rod sections;
 (f) a cutting tool having a proximal end adjustably mounted to the frame and a distal end that is radially beyond the pair of guide structures and is extendable radially beyond the radially outermost point of the frame;
 (g) a first guide wheel adjustably mounted to the frame by an eccentric shank that extends from the shaft about which the guide wheel rotates, the radially outermost point of the guide wheel being radially outward of the pair of guide structures and radially outward of the frame such that the frame and the pair of guide structures can travel with the guide wheel into the interior of the pipe during counterboring; and
 (h) a pair of actuators each having a frame end connected to the frame and a flywheel end connected to the flywheel, the pair of actuators oriented and located such that the actuators can move the frame along the guide rod sections of the pair of guide structures, the pair of actuators located radially inward of the cutting tool.

13. The apparatus of claim 12 wherein the actuators comprise hydraulically actuable pistons.

14. The apparatus of claim 13 further comprising a second guide wheel rotatably mounted to the frame laterally adjacent the first guide wheel.

15. The apparatus of claim 12 wherein each of the actuators comprises a hydraulic chamber with a piston, the piston having one end connected to the frame and the hydraulic chamber being attached to the flywheel.

16. The apparatus of claim 12 wherein the proximal end of the cutting tool comprises a tool post disposed in a bore defined in the frame.

17. The apparatus of claim 16 further comprising an adjustable set screw extending through the frame into the bore and in contact with the bottom of the tool post.

18. The apparatus of claim 17 further comprising a relief slot located in the frame proximate to the cutting tool and at least one locking bolt extending through the relief slot threadedly engaging the frame for securing the position of the cutting tool once adjusted.

19. The apparatus of claim 17 further comprising a locking nut on the set screw for securing the set screw at a desired position.

20. An apparatus for machining a counterbore in a pipe, the pipe having an inside surface, a longitudinal axis, an axial end face with a radial extent and an outside surface, the apparatus comprising:
 (a) an expander unit adapted for being secured against the inside surface of the pipe;
 (b) a shaft extending from the expander unit that has a center axis coaxial with the longitudinal axis of the pipe when the expander unit is secured against the inside surface of the pipe;
 (c) a flywheel rotatably and slidably mounted on the shaft, the flywheel having a rotational axis coaxial with the center axis of the shaft, and a front side axially facing the expander unit, the flywheel being slidable in an axial direction along the shaft over a distance at least the length of the counterbore to be machined in the pipe, the flywheel being simultaneously slidable and rotatable on the shaft;
 (d) a pair of guide structures mounted on the flywheel parallel to each other and each having a first end and a second end each connected to the flywheel, and a guide rod section extending from the first end to the second end in a plane parallel to the front side of the flywheel and set off axially from the front side of the flywheel such that there is a clearance between the guide rod sections and the front side of the flywheel, each guide structure being located substantially the same distance from the center axis of the flywheel;
 (e) a frame defining a pair of guide channels therein that are slidably disposed on the guide rod sections of the pair of guide structures such that said frame is linearly slidable in a radial direction relative to the center axis of the flywheel along the guide rod sections;
 (f) a cutting tool interconnected to a tool post, the tool post located in a bore in the frame, the cutting tool having a distal end radially outward of the pair of guide structures and the frame;
 (g) a relief slot located in the frame opening into the bore in which the tool post is located in;
 (h) at least one locking bolt extending through the relief slot threadedly engaging the frame providing a clamping force for securing the radial extent of the tool post;

(i) a set screw extending through the frame, into the bore and contacting the bottom of the tool post for adjusting the radial extent of the tool post relative to the frame when the locking bolts are loosened;

(j) a first guide wheel rotatably mounted to the frame, through a shaft and a roller bearing, the guide wheel having an axis of rotation parallel to that of the flywheel, the radially outermost point of the guide wheel being radially outward of the pair of guide structures and radially outward of the frame such that the frame and the pair of guide structures can travel with the guide wheel into the interior of the pipe during counterboring; and (k) a pair of actuators each having a frame end connected to the frame and a flywheel end connected to the flywheel, the pair of actuators oriented and located such that the actuators can move the frame along the guide rod sections of the pair of guide structures, the pair of actuators located radially inward of the cutting tool.

21. A method of counterboring a pipe with a counterbore apparatus having an expander unit having a longitudinally located shaft extending therefrom, a flywheel rotatably and slidably mounted on the shaft, a frame slidably attached to said flywheel with a guide wheel and a cutting tool mounted thereon extending radially outward of the frame, and a pair of actuators located radially inward of the cutting tool for linearly sliding the frame from a lowered position to a raised position, which comprises the steps of:

(a) inserting the expander unit into the pipe;

(b) securing the expander unit against the inner surface of the pipe;

(c) advancing the flywheel towards the end of the pipe with the frame in the lowered position until the cutting tool is adjacent the axial end face of the pipe;

(d) linearly sliding the frame along a pair of guide structures located radially inward of the cutting tool to the raised position by actuating the pair of actuators until the guide wheel is in contact with the inner surface of the pipe;

(e) rotating the flywheel and simultaneously advancing the flywheel along the shaft a predetermined distance to force the cutting tool against the end of the pipe and such that the guide wheel together with the cutting tool, the frame, and the pair of guide structures travel into the interior of the pipe as the cutting tool machines a counterbore.

* * * * *